(12) United States Patent
Grajski (10) Patent No.: US 7,236,932 B1
(45) Date of Patent: Jun. 26, 2007

(54) METHOD OF AND APPARATUS FOR IMPROVING PRODUCTIVITY OF HUMAN REVIEWERS OF AUTOMATICALLY TRANSCRIBED DOCUMENTS GENERATED BY MEDIA CONVERSION SYSTEMS

(75) Inventor: Kamil Grajski, San Jose, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 837 days.

(21) Appl. No.: 09/659,861

(22) Filed: Sep. 12, 2000

(51) Int. Cl.
*G10L 21/00* (2006.01)
(52) U.S. Cl. .................. 704/277; 704/235
(58) Field of Classification Search .......... 704/235, 704/270, 277
See application file for complete search history.

(56) References Cited

U.S. PATENT DOCUMENTS

| | | | | |
|---|---|---|---|---|
| 5,179,627 A * | 1/1993 | Sweet et al. | | 704/200 |
| 5,201,292 A | 4/1993 | Grajski et al. | | 123/425 |
| 5,408,410 A * | 4/1995 | Kaji | | 704/2 |
| 5,557,659 A | 9/1996 | Hyde-Thomson | | 379/88 |
| 5,572,570 A * | 11/1996 | Kuenzig | | 379/1.02 |
| 5,577,135 A | 11/1996 | Grajski et al. | | 382/253 |
| 5,659,742 A * | 8/1997 | Beattie et al. | | 707/104.1 |
| 5,794,178 A * | 8/1998 | Caid et al. | | 704/9 |
| 5,883,986 A * | 3/1999 | Kopec et al. | | 382/310 |
| 5,933,822 A * | 8/1999 | Braden-Harder et al. | | 707/5 |
| 5,991,595 A * | 11/1999 | Romano et al. | | 434/353 |
| 6,122,614 A * | 9/2000 | Kahn et al. | | 704/235 |
| 6,154,757 A * | 11/2000 | Krause et al. | | 715/530 |
| 6,275,806 B1 * | 8/2001 | Pertrushin | | 704/272 |
| 6,279,017 B1 * | 8/2001 | Walker | | 715/529 |
| 6,421,643 B1 * | 7/2002 | Kahn et al. | | 704/270 |
| 6,490,558 B1 * | 12/2002 | Kahn et al. | | 704/235 |
| 6,542,602 B1 * | 4/2003 | Elazar | | 379/265.06 |
| 6,578,007 B1 * | 6/2003 | Howes et al. | | 705/9 |
| 6,651,041 B1 * | 11/2003 | Juric | | 704/228 |
| 6,704,709 B1 * | 3/2004 | Kahn et al. | | 704/235 |

* cited by examiner

*Primary Examiner*—Michael N. Opsasnick
(74) *Attorney, Agent, or Firm*—Haverstock & Owens LLP (57) ABSTRACT

An apparatus for improving productivity of human reviewers of transcribed documents generated by media conversion systems includes a server/client network of computers, memories and file systems. The server receives and stores voice files created by users of the system. The server is configured for coupling to a speech-to-text media conversion system to receive converted text files of the audio voice files. The server analyzes the converted text files and routes the converted files to the appropriate reviewers according to an adaptive algorithm. The converted files are displayed on the assigned reviewer's screen at the reviewer's workstation. To aid the reviewer in pinpointing potential errors, the workstation displays different segments of the converted files in different colors to reflect different confidence levels of transcription accuracy. Portions of the original voice message that correspond to the potential errors are played back for the reviewer. The reviewers' workstations also perform productivity enhancing functions such as spelling and grammar checking. After the reviewer has made all the necessary corrections, the reviewed files are transmitted back to the server to be stored and accessed by the users. A user database in the server is also updated to store recurrent user-specific errors corrected by the reviewer. A language analysis system is also disposed to adaptively correct user-specific errors in future reviews according to the information in the user database.

36 Claims, 5 Drawing Sheets

METHOD OF AND APPARATUS FOR IMPROVING PRODUCTIVITY OF HUMAN REVIEWERS OF AUTOMATICALLY TRANSCRIBED DOCUMENTS GENERATED BY MEDIA CONVERSION SYSTEMS

FIELD OF THE INVENTION

The present invention relates to the field of media conversion systems. More particularly, the present invention relates to an apparatus for and method of improving productivity of human reviewers of transcribed files generated by media conversion systems.

BACKGROUND OF THE INVENTION

Recent advances in media conversion technology, such as speech-to-text conversion and optical character recognition (OCR), have made it possible for computers to perform tasks such as transcribing messages or documents dictated by a user. Dictation systems for personal computers are now fairly common. Also available are scanning or OCR systems that are capable of converting the content of a printed document into computer readable form. These systems, however, are sometimes inaccurate. The users often need to proof-read and make corrections to the output of these systems.

Also emerging as a new technology is the unified messaging system. The Unified Messenger™, manufactured by Octel Communications Corporation of Milpitas, Calif., is one such system. These unified messaging systems integrate a user's fax messages, voice messages and e-mails in a single logical mailbox such that they can be accessed by telephone or computer. For instance, the Unified Messenger can convert an e-mail message into a voice message so that it can be read to the user over the telephone. Such a system is described in U.S. Pat. No. 5,557,659, which is incorporated herein by reference.

Data entry personnel are currently utilized for the conversion of an audio message to a text message sent to a user's paging device. In such a system, a caller desiring to send a message, telephones the user's paging service and communicates the message to a data entry employee of the paging service. This employee enters the message into a computer and then transmits it to the user's paging device. The text message entered by the employee of the paging service is then displayed on the display of the user's paging device. The use of human employees in the text entry and transcription of audio messages is expensive and inefficient. Current automated systems are not reliable and accurate enough to be used for a fully automated messaging or transcription system. Accordingly, what is needed is an automated system which also employs human reviewers to maximize the efficiency and effectiveness of the reviewers.

When documents are dictated and recorded as an audio file, a person transcribing the document plays the audio file and enters text representing the document recorded on the audio tape. The use of human employees in text entry and transcription of audio messages is expensive and inefficient. Automated speech-to-text conversion systems are also currently available to convert audio recordings into a text document. However, such conversion systems are inaccurate, requiring the users to proof-read and make corrections to the output of the systems.

SUMMARY OF THE INVENTION

An apparatus for improving productivity of human reviewers of transcribed documents generated by media conversion systems includes a server/client network of computers, memories and file systems. The server receives and stores voice files created by users of the system. The server is configured for coupling to a speech-to-text media conversion system to receive converted text files of the audio voice files. The server analyzes the converted text files and routes the converted files to the appropriate reviewers according to an adaptive algorithm. The converted files are displayed on the assigned reviewer's screen at the reviewer's workstation. To aid the reviewer in pinpointing potential errors, the workstation displays different segments of the converted files in different colors to reflect different confidence levels of transcription accuracy. Portions of the original voice message that correspond to the potential errors are played back for the reviewer. The reviewers' workstations also perform productivity enhancing functions such as spelling and grammar checking. After the reviewer has made all the necessary corrections, the reviewed files are transmitted back to the server to be stored and accessed by the users. A user database in the server is also updated to store recurrent user-specific errors corrected by the reviewer. A language analysis system is also disposed to adaptively correct user-specific errors in future reviews according to the information in the user database.

BRIEF DESCRIPTION OF THE DRAWINGS

FIG. 2 is a flow diagram illustrating the operations of the preferred embodiment of the present invention when a reviewer logs on.

DETAILED DESCRIPTION OF THE PREFERRED EMBODIMENT

Figure 1:
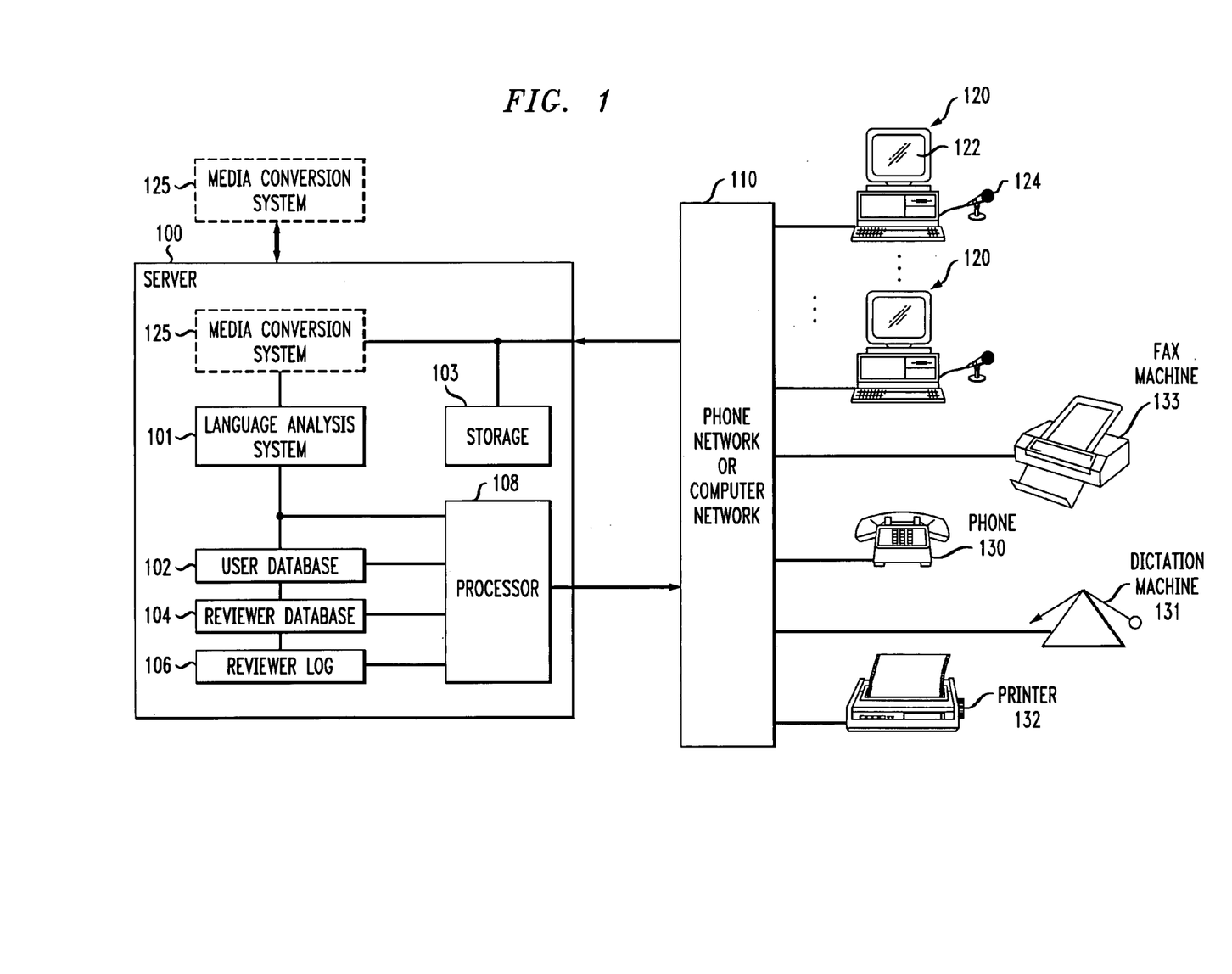
FIG. 1 illustrates in block diagram form a system of the preferred embodiment of the present invention, including a server, a media conversion system, and a network coupling reviewer workstations, communication devices, and output peripherals to the server.

FIG. 1 illustrates in block diagram form a system of the preferred embodiment of the present invention. The present invention is directed to an apparatus for and method of improving productivity of human reviewers of automatically transcribed documents generated by media conversion systems. It is the purpose of this patent to cover all media conversion systems including but not limited to speech-to-text, text-to-speech, OCR and hand-writing recognition systems, as well as other information processing systems which may require human supervision. However, for the sake of simplicity, the exemplary system illustrated in FIG. 1 and described herein is configured for coupling to only a speech-to-text media conversion system. However, as should be apparent to those skilled in the art, the preferred embodiment of the present invention is easily adapted for use with other types of media conversion systems or information processing systems.

As shown in FIG. 1, a speech-to-text media conversion system 125 is coupled to a server 100. The speech-to-text media conversion system 125 preferably includes a conventional computer having a voice processing card such as a SoundBlaster 16 from Creative Labs, and running voice recognition software, such as Naturally Speaking from Dragon Systems, Inc. Alternately, the speech-to-text system 125 is integral to the server 100. The speech-to-text media conversion system 125 automatically converts audio voice files to a text document.

The server 100 is preferably coupled through a telephone switching network 110 to a plurality of reviewer workstations 120 and a plurality of input devices. The input devices include any appropriately configured device through which a user can communicate a message to the server 100. In the exemplary system, illustrated in FIG. 1, a telephone set 130, and a dictation machine 131 are included as input devices. Alternately, the input devices are coupled to the server 100 through a PBX or other appropriate network. In a further alternate embodiment, the server 100 is coupled to the reviewer workstation 120 via a computer network such as the Internet. The server 100 is also coupled to a plurality of output peripherals including a fax machine 133 and a printer 132. The reviewer workstations 120 can be located in a centralized location or can be located at the reviewer's office or home and connected to the server 100 through the telephone network by a modem.

Preferably, the server 100 includes an integral language analysis system 101 for improving the accuracy of the text document generated by the speech-to-text media conversion system 125. It is important to note that the language analysis system 101 performs functions different from those of the speech-to-text media conversion system 125. While the speech-to-text media conversion system 125 analyzes and translates the voice files phonetically, the language analysis system 101, such as the Mikrokosmos semantic analyzer from New Mexico State University at Las Cruces, N. Mex., analyzes the context of the resulting text document and corrects phonetically correct but contextually inappropriate words. For example, if the speech-to-text media conversion system 125 converts the sentence: "I red a book", the language analysis system 101 will substitute "read" with "red" in order to correct the resulting text document. In addition, user-specific mistakes that have been corrected in previous reviews of documents submitted by the user are also stored in a user database 102 within the server 100. Preferably, the language analysis system 101 is disposed to adaptively process the text file according to the information stored in the user database 102.

The user database 102 is also integral to the server 100 and contains information pertaining to the identities of the users. In addition, the user database 102 contains a list of reviewers who have previously reviewed documents submitted by the user. Furthermore, the user database 102 includes a list of preferred reviewers designated by the user. The preferred reviewers are given a higher priority during the assignment process, after the user has submitted a new document.

In the preferred embodiment of the present invention, the server 100 also includes a reviewer database 104. The reviewer database 104 contains a plurality of skill sets for each of the reviewers. A skill set is a list of keywords that a reviewer is familiar with. For instance, for a reviewer proficient in reviewing or transcribing medical documents, his skill set will include common medical terms. The reviewer database 104 is updated when a new reviewer is hired, or when a reviewer acquires a new skill set. The reviewer database 104 also contains other information, such as the number of reviews made and the average time a reviewer spends to finish reviewing a document. Other information useful for evaluating the performance of the reviewer is also stored in the reviewer database 104.

The server 100 also maintains a reviewer log 106 which comprises a list of currently available reviewers. The reviewer log 106 is updated whenever a reviewer logs on or off the server 100, or when a reviewer is assigned a new reviewer package. The server 100 uses this information as a basis for determining whether a reviewer is available to accept a newly submitted document.

The server 100 includes the control processor 108 which is coupled to the language analysis system 101, the user database 102, the reviewer database 104 and the reviewer log 106. The control processor 108 controls the acceptance of a new document from a user and the assignment of the document to a reviewer. The control processor 108 is also coupled to communicate with the network 110 in order to send a document to a reviewer's workstation and to communicate instructions to and receive confirmations from the reviewer.

The server 100 also includes a storage device 103 for storing documents to be sent to or received from reviewers. The storage device 103 is preferably a hard disk drive. Alternately, the storage device 103 is any appropriately configure media storage device.

After a voice file is created, it is transmitted to the speech-to-text media conversion system 125 for conversion into a corresponding text file, and then to the language analysis system 101. The language analysis system 101 checks the text document for contextually and grammatically incorrect words as described above. The server 100 then determines which one of the currently available reviewers listed in the reviewer log 106 should review the text document. The server 100 makes this decision by first extracting a list of keywords from the text file. The keywords are extracted from the text file by searching the document and comparing it to a keyword database stored in the storage device 103. The server 100 then matches the list of keywords to a skill set within the reviewer database. If the skill set of a reviewer matches the keywords, and if that particular reviewer is available, the server will route the text document file and pointers corresponding to the voice file to the workstation 120 associated with the reviewer. Alternately, the actual voice file is also routed to the reviewer's workstation 120. By assigning text files to reviewers with specialized knowledge and skills in a particular field, the productivity of the reviewers is increased.

To fully maximize the throughput of the reviewers, each of the reviewers' workstations 120 are equipped with a color monitor 122 and a microphone 124. Preferably, the reviewers' workstations 120 also include other conventional input devices such as a keyboard, mouse and a foot pedal. The color monitor 122 is preferred because it is desirable to display the transcribed text file in different colors. In the preferred embodiment, sections of the transcribed text file having a low confidence level are displayed in red, sections of the text having a high confidence level are displayed in green and sections of the text having a medium confidence level are displayed in yellow. Alternately, any desired color combination can be used to highlight the different confidence levels within the text document. With the contrasting colors representing the different confidence levels, the reviewer is able to quickly pinpoint potential errors without carefully reading every single word in the document. Alternately, a monochrome monitor is included at the reviewers' workstation 120. In this alternate embodiment, sections of the transcribed text file having a low confidence level are highlighted and sections of text having a high confidence level are displayed normally. In a further alternate embodiment, sections of the text file having a low confidence level are underlined, and sections of the text file having a high confidence level are italicized.

The microphone 124 further increases productivity by obviating the need to use a mouse or other conventional input device to navigate around the document. In the preferred embodiment, the workstation 120 is voice activated and controlled by simple voice commands such as "select", "delete", "scroll down", etc. Alternately, the workstation 120 utilizes the keyboard to enter any changes to the text file, and the mouse to select a portion of the text document and the foot pedal 1Q to start and stop the replay of the recorded audio voice file.

Figure 2:
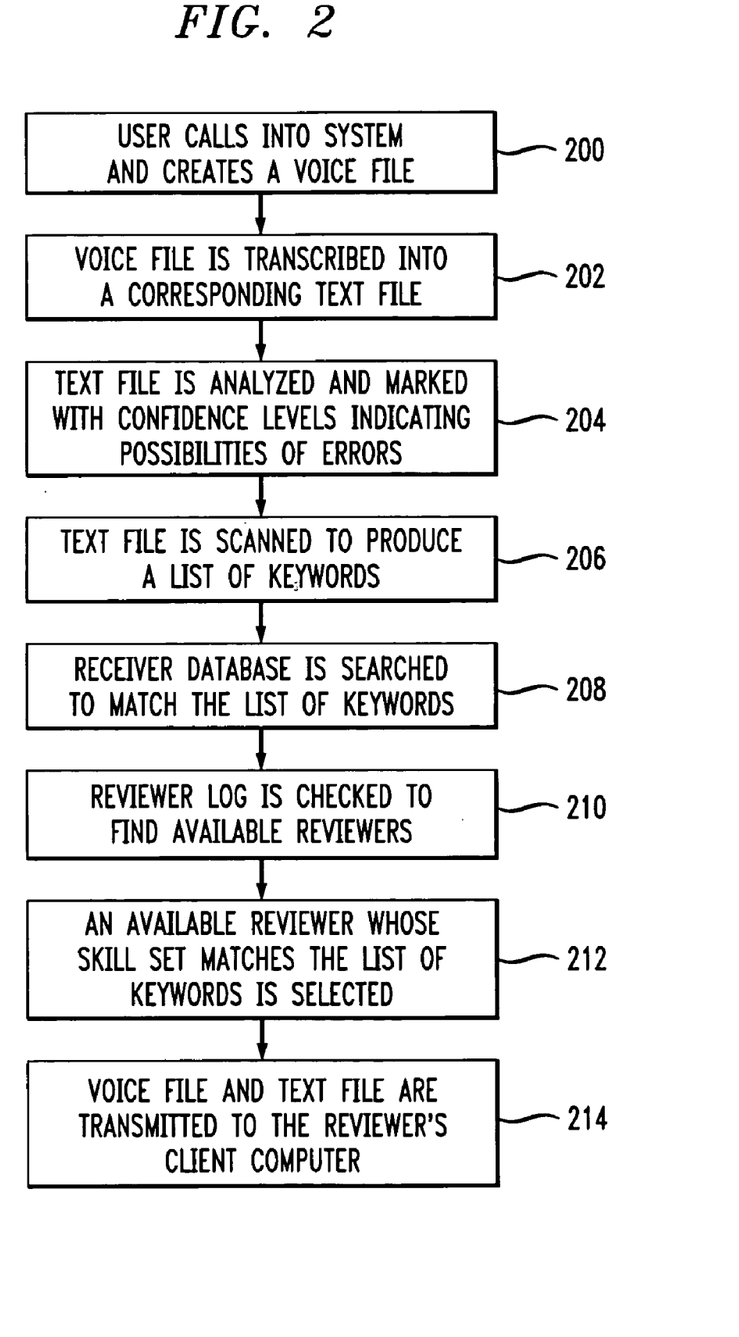

FIG. 2 is a flow diagram illustrating the operations of the server in selecting an appropriate reviewer. As shown at the step 200, a user first calls the system through an input device such as the telephone 130 or the dictation machine 131 and records a voice file. The voice file is then transferred to a speech-to-text media conversion system 125 where it is automatically transcribed into a corresponding text file at the step 202. The voice file is then stored in conjunction with the text file in the memory storage device 103. At the step 204, the text file is analyzed by the language analysis system and marked with confidence levels indicating the possibility of errors as described above. The language analysis system 101 determines which parts of the text document are likely to be erroneous, and which parts are likely to be correct. The text file is also scanned by the language analysis system 101 at the step 206 to produce a list of keywords corresponding to the text file. At the step 208, the list of keywords corresponding to the text file is compared with the skill sets in the reviewer database 104. The reviewer database 104 contains a list of keywords relating to the field with which the reviewer is familiar. By matching the words contained in the skill sets with the words in the list generated by the speech-to-text media conversion system 125, the reviewers whose skill set has a higher correlation with the list of keywords will be accorded a higher priority. Then, the reviewer log 106 is consulted to determine the current availability of the reviewers at the step 210. The available reviewer with the highest priority is selected at the step 212 and a reviewer package containing the voice file and the text file, as well as the criteria for selection is sent to the workstation 120 of the selected reviewer at the step 214. Within the preferred embodiment of the present invention, the assignment process can be manually overridden such that a user may request a particular reviewer to review his document.

In some applications, it is desirable to give a higher priority to a reviewer who has prior experience with the user. In these applications, the system will store a number representative of the number of times a reviewer has reviewed documents from a particular user. This feature can be used in conjunction with the features described above to select the most appropriate reviewer and to maximize the reviewer's review of documents with which he has a familiarity.

Figure 3:
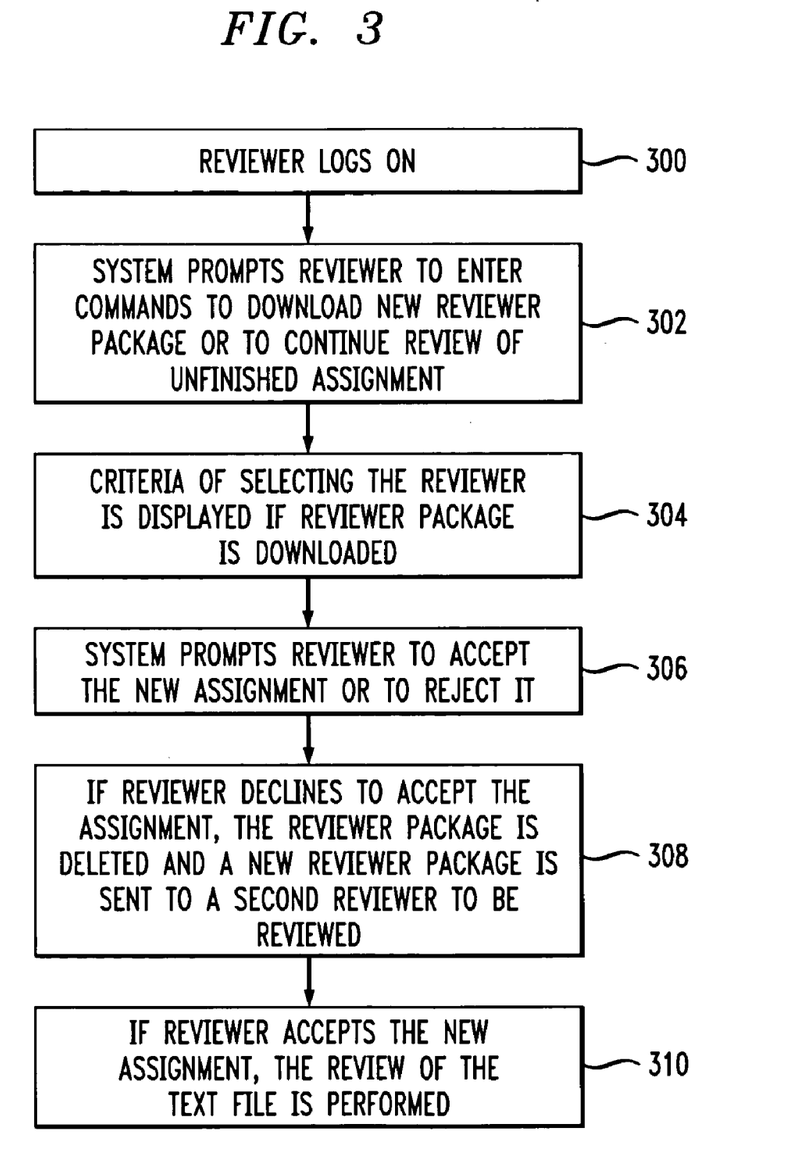
FIG. 3 is a flow diagram illustrating the operations of the server in selecting an appropriate reviewer.

FIG. 3 is a flow diagram illustrating the operations of the preferred embodiment of the present invention when a reviewer logs on to the server 100.

As shown, a reviewer logs on to the server 100 through a workstation 120 by entering his name and an identity verifying a password at the step 300. The reviewer is then prompted to download a new reviewer package from the server 100 at the step 302. If the reviewer desires to receive a new assignment, the reviewer enters the appropriate commands to download the appropriate files from the server 100 to the reviewer's workstation 120. After a reviewer package is downloaded, the reviewer's workstation 120 displays the criteria used for selecting the reviewer at the step 304. The criteria for selecting the reviewer is displayed so that the reviewer is able to quickly determine if the system has correctly assigned tasks matching his skill set. The reviewer may choose to review the transcription or to reject the assigned task at the step 306. If the task is rejected, the reviewer package is deleted, the server selects a second reviewer and a new reviewer package is transmitted to the workstation 120 corresponding to the second reviewer at the step 308. Once a reviewer accepts the new assignment, the review of the text file is performed at the step 310, as illustrated in the steps included in FIGS. 4 and 5.

Figure 4:
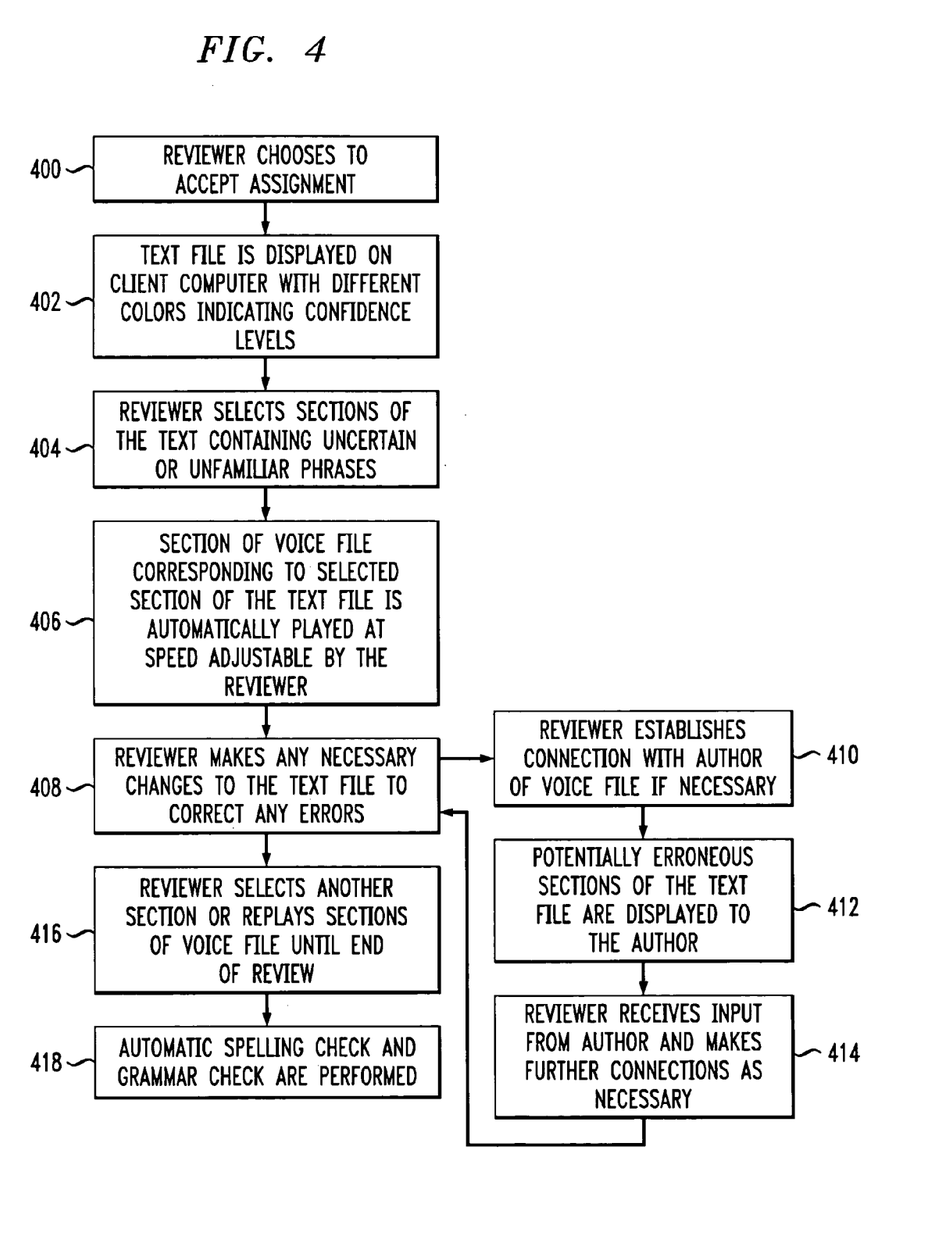
FIG. 4 is a flow diagram illustrating the operations of the present invention after a reviewer is selected.

FIG. 4 illustrates the operations of the present invention after a reviewer is selected. After a reviewer chooses to accept the assignment at the step 400, the text file is displayed in different colors according to the different confidence levels at the step 402, so that the reviewer can quickly pinpoint problematic or low confidence level areas, as described above. The reviewer then selects any appropriate portion of the text within the message using voice activated commands or other conventional input devices at the step 404 during their review. When a section of the text file is selected, preferably a corresponding section of the audio voice file is played for the reviewer at the step 406. The reviewer has the ability through the client computer 120 to control the speed of this audio replay. Alternatively, the reviewer particularly selects portions of the text for which the corresponding audio voice file is played. After listening to the voice file, the reviewer then corrects any inaccuracies at the step 408. In the event that the reviewer cannot determine accurately what was recorded from the voice file because of poor recording quality, the reviewer may establish a connection with the user who submitted the document at the step 410. If the author of the message also has access to a workstation 120, the text file is simultaneously displayed on the author's terminal at the step 412. The reviewer then receives comments from the author and makes further corrections to the file at the step 414.

The reviewer then repeats this process and corrects all the inaccuracies 1 within the text file at the step 416. After the reviewer is finished, a check for spelling and grammar mistakes is automatically performed at the step 418, to ensure that the document contains a minimal level of errors.

Figure 5:
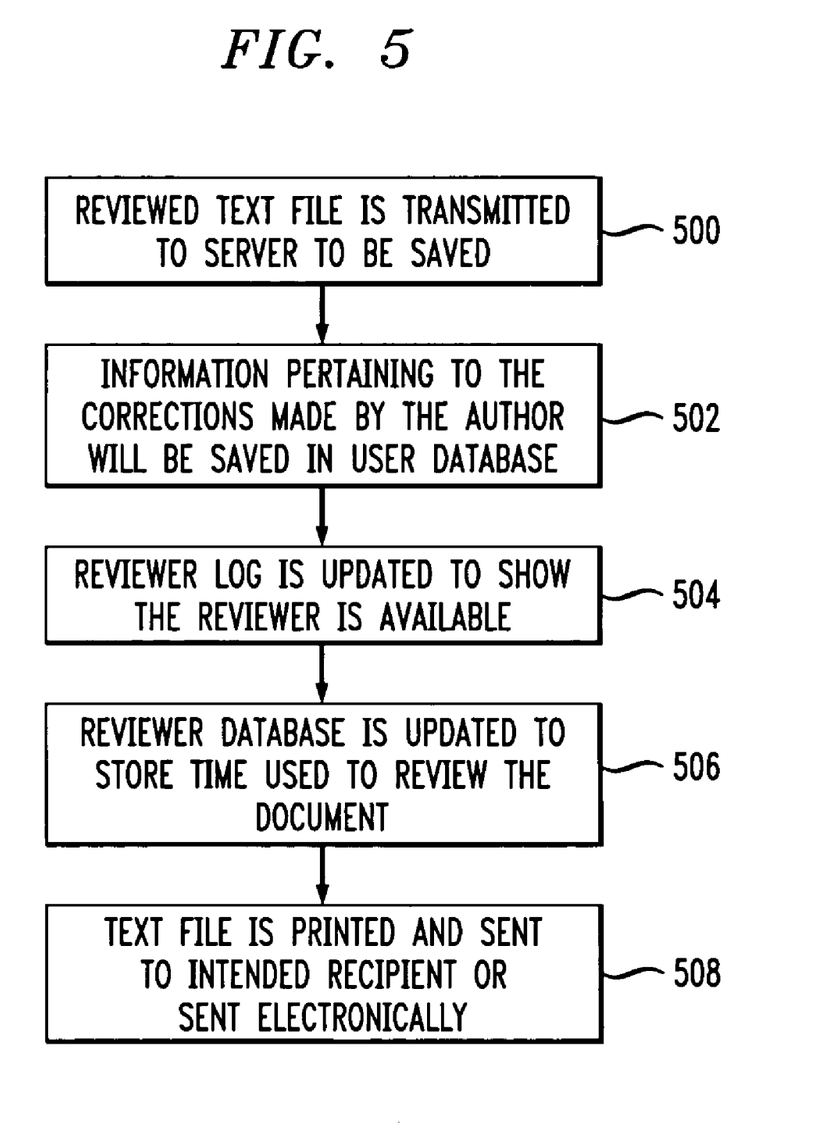
FIG. 5 is a flow diagram illustrating the operations of the present invention after the text document is reviewed.

FIG. 5 illustrates the operation of the preferred embodiment of the present invention after the review of the text document is complete and all apparent inaccuracies have been corrected. As shown in FIG. 5, after the reviewer has finished their review of the document, the edited text document is transmitted to the server 100 to be saved, at the step 500. The edited text document is saved within the media storage device 103. The server 100 also saves information pertaining to the corrections made by the author in the user database at the step 502. This information is used in transcriptions of future documents by that author. Then at the step 504, the list of available reviewers is updated to add the reviewer who finished the last review to the list of reviewers available for new assignments. The reviewer database is also updated at the step 506 to store the time necessary to review and correct the last file. Finally, at the step 508, the stored text file is printed out and sent to the author. The text file may also be sent electronically to an intended recipient as an e-mail document.

An apparatus for and method of improving the productivity of human reviewers of computer-processed information has herein been described. This apparatus and method improves the efficiency of human reviewers and improves accuracy of an automated conversion system. The present invention also enables an integrated messaging system to provide accurate transcriptions of many types of documents including converting voice messages into fax messages or e-mail messages at a low cost. Furthermore, employing the present invention, an integrated messaging system can accurately convert a fax message into a voice message to be retrieved by telephone.

Although the preferred embodiment of the invention uses a speech-to-text system for its implementation, it should be apparent to persons skilled in the art that other information processing functions, such as text-to-speech, OCR or handwriting recognition functions, can also be implemented within the system of the present invention based on the principles herein discussed. Further, there may evolve new message types that would allow similar implementations. Consequently, this disclosure is not meant to narrow the invention by illustrating the use of the speech-to-text media conversion system as an example. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

The invention claimed is:

1. An apparatus for improving productivity of human review of an automatically transcribed document generated by a speech-to-text conversion system, wherein the document is generated from an audio recording recorded by an author, the apparatus comprising:
  a. a controller coupled to the speech-to-text conversion system for selecting an appropriate one of a plurality of human reviewers to review the document wherein, the controller is capable of extracting an attribute from the document representative of a content of the document and further wherein the controller stores a plurality of reviewer profiles corresponding to each one of the human reviewers and provides the selected reviewer in response to the attribute;
  b. a transmission device coupled to the controller for transmitting the document and the audio recording to the selected reviewer;
  c. means for analyzing the transcription to associate portions of the transcription with a plurality of confidence levels of transcription accuracy, wherein each portion is marked according to one of the plurality of confidence levels;
  d. means for selecting one of the portions of the document in response to a command from the reviewer; and
  e. means for playing a portion of the voice recording corresponding to a selected portion of the transcription.

2. The apparatus according to claim 1 wherein the controller also stores a list of available reviewers, and further wherein the controller selects the selected reviewer in response to comparing the attribute with the reviewer profiles and the list of available reviewers.

3. The apparatus according to claim 1 wherein the attribute comprises a list of keywords representative of a subject matter of the document and further wherein each of the reviewer profiles comprises words relevant to the subject matter.

4. The apparatus according to claim 1 wherein the attribute comprises a name of the author of the voice recording and further wherein each of the reviewer profiles comprises a list of authors that a corresponding reviewer has served.

5. The apparatus according to claim 1 further comprising:
  a. means for establishing a connection between an author of the voice recording and the reviewer; and
  b. displaying the document to solicit comments from the author.

6. The apparatus according to claim 1 wherein the means for analyzing is disposed to adaptively process the document according to information stored in the user profiles.

7. The apparatus according to claim 1 wherein the means for selecting comprises a speech recognition system for receiving verbal commands from the reviewer.

8. The apparatus according to claim 1 wherein each portion of the document is displayed in a color representing a corresponding confidence level.

9. The apparatus according to claim 1 wherein the means for playing further comprises means for varying a playback speed of the voice recording.

10. The apparatus according to claim 1 further comprising a means for displaying for displaying the document for the reviewer.

11. The apparatus according to claim 10 wherein the means for displaying comprises a color monitor.

12. An apparatus for improving productivity of human review of an automatically transcribed output generated by an information processing system, wherein the output is generated in response to an input, the apparatus comprising:
  a. means for extracting an attribute from an automatically transcribed output generated by an information processing system in response to an input;
  b. means for selecting a specific one human reviewer from among a plurality of human reviewers based on the attribute;
  c. means for analyzing the output to associate portions of the output with a plurality of confidence levels of transcription accuracy; and
  d. means for marking each portion of the output according to a corresponding one of the plurality of confidence levels.

13. The apparatus according to claim 12 wherein the attribute represents a subject matter of the output, and further wherein the human reviewer is selected based on a proficiency in the subject matter of the human reviewer.

14. The apparatus according to claim 12 wherein the attribute represents an author of the input, and further wherein the human reviewer is selected based on a predetermined designation by the author of the input.

15. The apparatus according to claim 12 further comprising means for transmitting the input and the output to the selected human reviewer for review.

16. The apparatus according to claim 12 further comprising means for automatically identifying potential errors contained in the output.

17. The apparatus according to claim 12 wherein the information processing system includes a speech-to-text system.

18. An apparatus for facilitating review of an automatically transcribed document generated by a media conversion system, wherein the document is generated in response to an input, the apparatus comprising:

a. means for extracting a keyword from the document, wherein the keyword is determined by comparing the document to a database of keywords;
b. means for selecting a specific one reviewer from among a plurality of reviewers in response to the keyword;
c. means for transmitting the input and the document to the selected reviewer for review;
d. means for analyzing the document to associate portions of the document with a plurality of confidence levels of transcription accuracy; and
e. means for marking each portion of the document according to a corresponding one of the plurality of confidence levels.

19. The apparatus according to claim 18 wherein the apparatus is configured for coupling to a speech-to-text system.

20. The apparatus according to claim 18 further comprising means for storing a plurality of user profiles, wherein each of the user profiles corresponds to one of a plurality of users of the apparatus, and further wherein the user profiles are adapted dynamically with corrections made by the reviewer.

21. The apparatus according to claim 18 further comprising means for updating a list of available reviewers.

22. The apparatus according to claim 18 further comprising:
a. means for selecting a portion of the document; and
b. means for outputting a portion of the input corresponding to the selected portion of the document.

23. The apparatus according to claim 18 further comprising:
means for displaying each portion in a predetermined color representing the corresponding one of the plurality of the confidence levels.

24. The apparatus according to claim 23 wherein the means for analyzing is disposed to adaptively process the document according to information stored in the user profiles.

25. The apparatus according to claim 18 further comprising means for storing a plurality of reviewer profiles, wherein each of the reviewer profiles corresponds to one of the plurality of reviewers, and further wherein the reviewer profiles are updated after the reviewer finishes review of the document.

26. The apparatus according to claim 25 wherein the keyword represents a subject matter of the document and further wherein each of the reviewer profiles includes words commonly used within a specific field of knowledge.

27. The apparatus according to claim 26 wherein the keyword represents a name of an author of the input.

28. The apparatus according to claim 26 wherein the means for selecting compares the keyword with each of the reviewer profiles to select the reviewer according to a predetermined selection criteria.

29. A method of improving productivity of human review of an automatically transcribed document generated by an information processing system, wherein the document is generated in response to an input, the method comprising the steps of:
a. extracting an attribute from the document, wherein the attribute is determined by comparing the document to a database of keywords;
b. selecting a specific one human reviewer from among a plurality of human reviewers based on the attribute;
c. analyzing the document to associate portions of the document with a plurality of confidence levels of transcription accuracy; and
d. marking each portion of the document according to a corresponding one of the plurality of confidence levels.

30. The method according to claim 29 wherein the step of selecting includes comparing the attribute with a plurality of reviewer profiles each corresponding to a respective one of the plurality of reviewers.

31. The method according to claim 29 wherein the step of selecting includes the steps of:
a. identifying an author of the input;
b. retrieving stored data about the author, wherein the stored data includes a roster of the reviewers who have previously served the author; and
c. choosing one of the reviewers from the roster.

32. The method according to claim 29 further comprising the step of displaying each of the portions in a predetermined color according to the confidence level.

33. The method according to claim 29 further comprising the step of automatically correcting grammatical and typographical errors of the transcription.

34. The method according to claim 29 further comprising the steps of:
a. establishing a connection between an author of the voice recording and the reviewer; and
b. displaying the transcription to the author to solicit comments.

35. The method according to claim 29 further comprising the steps of:
a. automatically identifying a portion of the document which is potentially erroneous;
b. playing an audio portion of the voice recording corresponding to the portion of the document upon a command of the human reviewer; and
c. making corrections to the document.

36. The method according to claim 35 wherein the audio portion of the voice recording is played back at a reviewer selectable speed.

* * * * *

UNITED STATES PATENT AND TRADEMARK OFFICE
CERTIFICATE OF CORRECTION

| | | |
|---|---|---|
| PATENT NO. | : 7,236,932 B1 | Page 1 of 1 |
| APPLICATION NO. | : 09/659861 | |
| DATED | : June 26, 2007 | |
| INVENTOR(S) | : Kamil Grajski | |

It is certified that error appears in the above-identified patent and that said Letters Patent is hereby corrected as shown below:

On the Title Page Item -56-

IN THE REFERENCES CITED -U.S. PATENT DOCUMENTS -

Add --5,715,372 A * 2/1998 Meyers.........395/021--

Column 8, line 27

Remove one of the "for displaying"

Column 9, line 31

Remove ":"

Signed and Sealed this

Twenty-first Day of August, 2007

JON W. DUDAS
*Director of the United States Patent and Trademark Office*